(12) United States Patent
Salah et al.

(10) Patent No.: US 12,159,398 B2
(45) Date of Patent: Dec. 3, 2024

(54) METHOD FOR ENRICHING A LEARNING BASE

(71) Applicant: DENTAL MONITORING, Paris (FR)

(72) Inventors: Philippe Salah, Paris (FR); Laurent Debraux, Paris (FR); Guillaume Ghyselinck, Cantin (FR); Thomas Pellissard, Paris (FR)

(73) Assignee: DENTAL MONITORING, Paris (FR)

( * ) Notice: Subject to any disclaimer, the term of this patent is extended or adjusted under 35 U.S.C. 154(b) by 420 days.

(21) Appl. No.: 17/283,530

(22) PCT Filed: Jul. 10, 2019

(86) PCT No.: PCT/EP2019/068561
§ 371 (c)(1),
(2) Date: Apr. 7, 2021

(87) PCT Pub. No.: WO2020/011865
PCT Pub. Date: Jan. 16, 2020

(65) Prior Publication Data
US 2021/0390687 A1     Dec. 16, 2021

(30) Foreign Application Priority Data

Jul. 13, 2018 (FR) .................. 1856498
Jul. 13, 2018 (FR) .................. 18564497
Dec. 21, 2018 (FR) .................. 1873792

(51) Int. Cl.
*G06T 7/00* (2017.01)
*G06N 3/045* (2023.01)
*G06N 3/08* (2023.01)

(52) U.S. Cl.
CPC ........... *G06T 7/0012* (2013.01); *G06N 3/045* (2023.01); *G06N 3/08* (2013.01);
(Continued)

(58) Field of Classification Search
CPC ......... G06T 7/0012; G06T 2207/20081; G06T 2207/20084; G06T 2207/30036; G06N 3/045; G06N 3/08
(Continued)

(56) References Cited

U.S. PATENT DOCUMENTS

2013/0022255 A1*  1/2013  Chen ................... G06T 7/12
                                                 382/173
2018/0125610 A1*  5/2018  Carrier, Jr. ............ H04N 5/272
(Continued)

OTHER PUBLICATIONS

Paul Upchurch, et al., "Deep Feature Interpolation for Image Content Changes", arxiv.org, Cornell University Library, 201 Olin Library Cornell University, Ithaca, NY 14853, Nov. 17, 2019. (Year: 2019).*

(Continued)

*Primary Examiner* — Van D Huynh
(74) *Attorney, Agent, or Firm* — Ronald M. Kachmarik; Cooper Legal Group LLC

(57) ABSTRACT

A method for enriching a historical learning base. Training of a first neural network to transform first photos of first dental scenes into first hyper-realistic images to simulate the effect of a dental event on the first dental scenes. Submission, to the trained first neural network, of a source photo representing a source dental scene in a dental context, so as to obtain a final image representing, hyper-realistically, the source dental scene after simulation of the dental event. Creation of a descriptor of the final image, or "final descriptor." Creation of a historical record consisting of the final image and the final descriptor, and addition of the historical record in the historical learning base.

13 Claims, 2 Drawing Sheets

1) training of a neural network to simulate the effect of a commonplace dental event on a dental arch represented on a photo 2) submission, to the neural network, of a "rare" source photo of a dental arch to obtain a hyper-realistic final image of the dental arch after it has undergone said dental event virtually 3) creation of a descriptor of the final image 4) creation of a historical record from the final image and addition of the historical record in the historical learning base

(52) U.S. Cl.
CPC ............... *G06T 2207/20081* (2013.01); *G06T 2207/20084* (2013.01); *G06T 2207/30036* (2013.01)

(58) Field of Classification Search
USPC ........................................................ 382/128
See application file for complete search history.

(56) References Cited

U.S. PATENT DOCUMENTS

| | | | | |
|---|---|---|---|---|
| 2018/0168780 A1* | 6/2018 | Kopelman | ............. | A61C 1/082 |
| 2018/0168781 A1* | 6/2018 | Kopelman | ............. | A61B 34/10 |
| 2019/0313963 A1* | 10/2019 | Hillen | ................... | G06V 10/764 |
| 2020/0281697 A1* | 9/2020 | Brandt | ................... | G16H 30/20 |
| 2020/0320685 A1* | 10/2020 | Anssari Moin | ........ | G06V 10/26 |

OTHER PUBLICATIONS

International Search Report corresponding to International Application No. PCT/EP2019/068561 dated Dec. 19, 2019, 7 pages.

Li Yu, et al., "Unsupervised Local Facial Attributes Transfer Using Dual Discriminative Adversarial Networks", 2018 IEEE International Conference on Multimedia and Expo (ICME), IEEE, Jul. 23, 2018, pp. 1-6.

Paul Upchurch, et al., "Deep Feature Interpolation for Image Content Changes", arxiv.org, Cornell University Library, 201 Olin Library Cornell University, Ithaca, NY 14853, Nov. 17, 2019.

Jun-Yan Zhu, et al. "Unpaired image-to-image translation using cycle-consistent adversarial networks" (Open access Computer Vision Foundation). 2017.

Andrej Karpathy, et al., "Deep Visual-Semantic Alignments for Generating Image Descriptions", in IEEE Conference on Computer Vision and Pattern Recognition (CVPR), Jun. 7, 2015. pp. 3128-3137.

Xiaodong He, et al., "Deep Learning for Image-to-Text Generation: A Technical Overview", IEEE Signal Processing Magazine, vol. 34, No. 6, Nov. 1, 2017, pp. 109-116.

Qi Wu, et al., "Image Captioning and Visual Question Answering Based on Attributes and Their Related External Knowledge", Cornell University Library 201 Olin Library Cornell University Ithaca, NY 14853, Mar. 9, 2016.

* cited by examiner

[Fig 1]
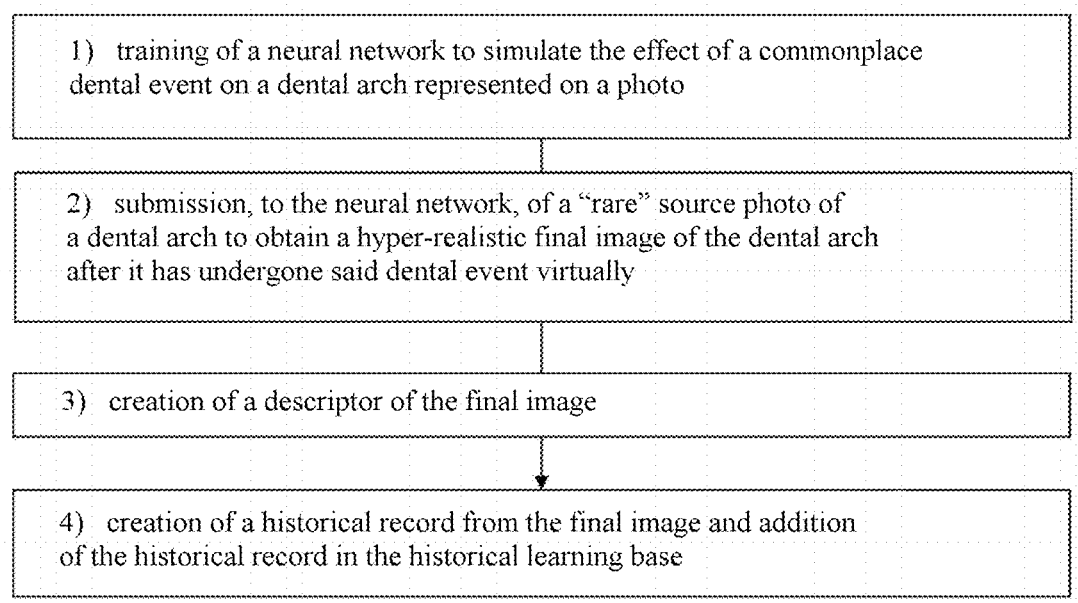
[Fig 2]
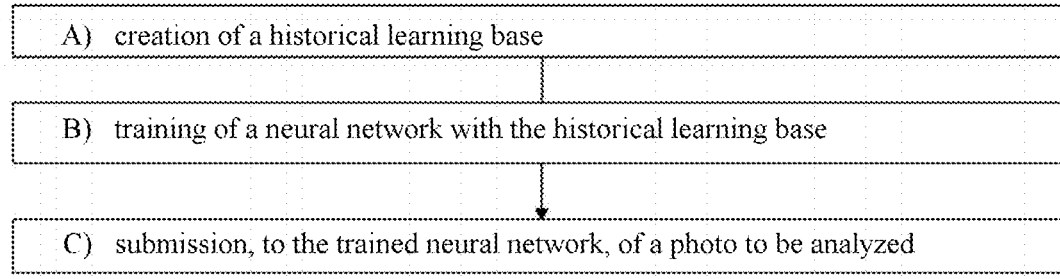
[Fig 3]
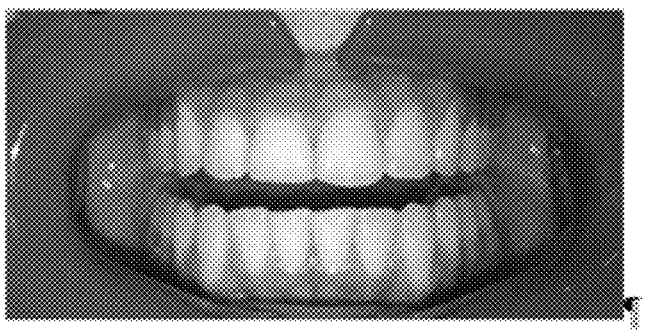

[Fig 4]
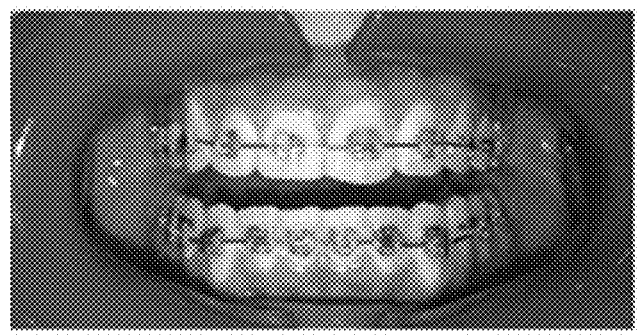

METHOD FOR ENRICHING A LEARNING BASE

TECHNICAL FIELD

The present invention relates to the field of the analysis of photos of dental arches. It relates in particular to a method for creating a learning base intended for the training of a neural network intended to perform such an analysis.

PRIOR ART

The most recent techniques use neural networks to assess dental situations from images, conventionally x-rays, notably for post mortem identification.

A "neural network" or "artificial neural network" is a set of algorithms well known to the person skilled in the art. The neural network can in particular be chosen from among:
- the networks specializing in the classification of images, called "CNN" ("convolutional neural network"), for example
  - AlexNet (2012)
  - ZF Net (2013)
  - VGG Net (2014)
  - GoogleNet (2015)
  - Microsoft ResNet (2015)
  - Caffe: BAIR Reference CaffeNet, BAIR AlexNet
  - Torch: VGG_CNN_S, VGG_CNN_M, VGG_CNN_M_2048, VGG_CNN_M_10 24, VGG_CNN_M_128, VGG_CNN_F, VGG ILSVRC-2014 16-layer, VGG ILSVRC-2014 19-layer, Network-in-Network (Imagenet & CIFAR-10)
  - Google: Inception (V3, V4).
- the networks specializing in the location and detection of objects in an image, the object detection networks, for example:
  - R-CNN (2013)
  - SSD (Single Shot MultiBox Detector: Object Detection network), Faster R-CNN (Faster Region-based Convolutional Network method: Object Detection network)
  - Faster R-CNN (2015)
  - SSD (2015).

The above list is nonlimiting.

To be operational, a neural network has to be trained by a learning process called "deep learning", from a learning base composed of a set of records each comprising an image and a descriptor of the image. By presenting the records as input for the neural network, the latter gradually learns how to generate a descriptor for an image with which it is presented.

For example, each record of the learning base can comprise an image of a dental arch and a descriptor identifying, in this image, the representations of the teeth, or "tooth zones", and the corresponding tooth numbers. Conventionally, these descriptors are generated by an operator who delimits, by means of a computer, the tooth zones, and who, after having identified the corresponding tooth, for example "right upper canine", assigns them a number accordingly. This operation is called "labeling". After having been trained, the neural network will thus be able to identify, on an image with which it is presented, the representations of the teeth and the corresponding tooth numbers.

The quality of the analysis performed by the neural network depends directly on the number of records in the learning base. Conventionally, the learning base has to comprise more than 10 000 records. There is a need for the rapid construction of such a learning base.

In some dental contexts, notably in the context of rare pathologies, the creation of a large number of records is made difficult by the limited number of photos produced, in particular by orthodontists and dentists, and by the generally confidentially nature of these photos. There is therefore a need for a method that allows an analysis of a dental context, by means of a neural network, from a limited learning base.

One aim of the invention is to address these needs.

Explanation of the Invention

SUMMARY OF THE INVENTION

The invention proposes a method for enriching a historical learning base, said method comprising the following steps:
1) training of a first neural network to transform first photos of first dental scenes into first hyper-realistic images to simulate the effect of a dental event on said first dental scenes;
2) submission, to the trained first neural network, of a source photo representing a "source" dental scene in a dental context, for example in a rare dental context, so as to obtain a final image representing, hyper-realistically, the source dental scene after simulation of the dental event;
3) creation of a descriptor of said final image, or "final descriptor";
4) creation of a historical record consisting of the final image and the final descriptor, and addition of the historical record in the historical learning base.

As will be seen in more detail hereinbelow, an enrichment method according to the invention makes it possible to obtain a historical learning base comprising numerous images representing, with the quality of photos, dental scenes in dental contexts for which few photos are available. The quality of these images advantageously allows them to be used to train a second neural network so that it can search, in the photos to be analyzed, for patterns specific to the dental context.

An enrichment method according to the invention can also comprise one or more of the following optional features:
- the dental event is chosen from among an application of an orthodontic appliance, a dental treatment, the occurrence of a pathology, a modification of a form, of a color or of a position of a tooth or several teeth and/or of the tongue and/or of the gum and/or of an arch and/or of the temporomandibular joint and/or of the form of the face, and/or of a relationship between the two arches, and a modification of the conditions of observations of a first dental scene;
- more than 10 000 first photos exist and, preferably, are public;
- the dental context is that of a dental pathology which affects less than 10% of the population and/or for which fewer than 10 000 photos representing a dental arch suffering from said dental pathology exist and, preferably, are public;
- the source photo does not show symptoms of said pathology;
- the first neural network is trained to, in step 2), add only one or more elements to the source photo;
- the first neural network is trained to, in step 2), add only an orthodontic appliance to the source photo;

in step 1), several first neural networks, preferably more than 2, more than 3, more than 5 or more than 10 first neural networks, are trained to simulate the effect of different dental events, then, in step 2), the source photo is submitted to said trained first neural networks so as to generate several final images;

the first photos and/or the source photo are extra-oral views taken by means of a dental retractor.

The invention relates also to a method for analyzing a photo to be analyzed representing a dental scene to be analyzed, said method comprising the following steps:

A) creation of a historical learning base comprising more than 1000 historical records, by implementing an enrichment method according to the invention;

B) training of a second neural network, by means of the historical learning base;

C) submission, to the trained second neural network, of the photo to be analyzed, so as to obtain a descriptor of the photo to be analyzed.

When the dental context is, for example, the occurrence of a rare pathology, the second neural network thus advantageously makes it possible to assess whether the dental scene on the photo to be analyzed to be analyzed corresponds to that pathology.

Preferably, before step C), the photo to be analyzed is taken by the patient with their smartphone, step C) is implemented by a computer, incorporated in the smartphone or with which the smartphone can communicate, after step C), the computer informs the patient, preferably via the smartphone, of the result of the analysis.

The methods are performed by computer. In particular, the first and second neural networks are created, trained and implemented by computer. The submission of a photo to a neural network, the creation of a descriptor and the addition of a record are also operations performed by means of a computer, possibly with the assistance of an operator, preferably without the assistance of an operator except to launch a computer program.

The invention therefore relates also to:

a computer program comprising program code instructions for the execution of one or more steps of any method according to the invention, when said program is run by a computer, a computing medium on which is stored such a program, for example a memory or a CD-ROM.

Definitions

A "patient" is a person for whom a method according to the invention is implemented, independently of whether or not this person follows an orthodontic treatment.

A "dental situation" defines a set of characteristics relating to a dental arch, for example the position of the teeth, their form, the position of an orthodontic appliance, etc. A "dental context" characterizes a set of dental situations, for example characterizes a pathology. A dental context can be, for example, that of a malocclusion.

An "image" is a representation, in two dimensions and formed by pixels, of a dental scene. A "photo" is therefore a particular image, conventionally in colors, taken with a camera. A "camera" is understood to be any apparatus allowing a photo to be taken, which includes a camera, a smartphone, a tablet or a computer.

A "hyper-realistic image" is an image which is not a photo but which seems to be a photo.

A "scene" consists of a set of elements which can be observed simultaneously. A "dental scene" is a scene comprising at least a part of a dental arch.

"Image of an arch", "photo of an arch", "representation of an arch", etc. are understood to mean an image, a photo, a representation, etc., of all or part of said dental arch.

A "retractor" is a device which comprises a top edge and a bottom edge extending around a retractor opening. In service position, the top and bottom lips of the patient bear on the top and bottom edges, respectively. The retractor is configured so as to elastically separate the top and bottom lips from one another, so as to clear the teeth that can be seen through the opening. A retractor thus makes it possible to observe the teeth without being hampered by the lips. The teeth do not however rest on the retractor, so the patient can, by turning the head with respect to the retractor, modify the teeth which can be seen through the opening of the retractor. It is also possible to modify the separation between the arches. Preferably, the retractor has cheek-separating lugs, this making it possible to observe the vestibular face of the teeth at the bottom of the mouth, such as the molars.

A "learning base" is a database of computer records suitable for training a neural network. Each record comprises an object, for example an image, and information on that object, or "descriptor". A descriptor comprises values for attributes of the object. For example, an attribute of an image of a dental scene can be used to identify the numbers of the teeth represented. The attribute is then "tooth number" and, for each tooth, the value of this attribute is the number of that tooth. An attribute of an image of a dental scene can also define a pathology from which the patient suffers, an occlusion class, a position of the mandible with respect to the maxilla ("overbite" or "overjet"), an overall health index or a size index, for example.

In the present description, the qualifiers "historical", "first", "second", "commonplace", "rare", "source", "final" and "of analysis" are used for the purposes of clarity.

"Comprising" or "including" or "having" should be interpreted in a non-restrictive manner, unless stipulated otherwise.

BRIEF DESCRIPTION OF THE DRAWINGS

Other features and advantages of the invention will become more apparent on reading the following detailed description and on studying the attached drawing in which:

FIG. 1 schematically represents the various steps of an enrichment method according to the invention;

FIG. 2 schematically represents the various steps of an analysis method according to the invention;

FIG. 3 represents a source photo;

FIG. 4 represents a final image obtained by means of a method according to the invention, from the source photo of FIG. 3.

DETAILED DESCRIPTION

The following detailed description is that of preferred embodiments, but is not limiting.

Enrichment Method

As illustrated in FIG. 1, a method for enriching a historical learning base according to the invention comprises steps 1) to 3).

In step 1), a first neural network can be trained with a first learning base consisting of a set of first records, each first recording comprising:

a first photo representing a first dental scene; and a first descriptor specifying a value for at least one attribute of the first photo relating to the occurrence of a dental event for the first dental scene;

at least a part of the first photo is representing first dental scenes after they have been subjected to the dental event.

The first neural network can in particular be chosen from the list supplied in the preamble to the present description.

The first photos are preferably extra-oral views, for example photos taken facing the patient, preferably with a dental retractor.

The dental event can be, for example, the fitting of an orthodontic appliance. The value of said attribute then indicates whether an orthodontic appliance is represented in the first photo. The attribute can be, for example, "presence of an orthodontic appliance" and take the values "yes" or "no".

The dental event is preferably "commonplace", that is to say, widely occurring.

Preferably, more than 500, more than 1000, more than 5000, preferably more than 10 000 photos representing dental scenes in which a dental arch has been subjected to the dental event, for example to the fitting of an orthodontic appliance, exist and preferably are public.

The dental event can in particular be chosen from among an application of an orthodontic appliance, a dental treatment, in particular orthodontic, therapeutic or not, the occurrence of a pathology, and a modification
- of a form, of a color or of a position of a tooth or several teeth and/or of the tongue and/or of the gum and/or of an arch and/or of the temporomandibular joint (TMJ) and/or of the form of the face, and/or
- of a relationship between the two arches (for example modification of the occlusion plane or of the occlusion class).

The first learning base preferably comprises more than 1000, more than 5000, preferably more than 10 000, preferably more than 30 000, preferably more than 50 000, preferably more than 100 000 first records. The greater the number of records, the better the capacity of the first neural network to modify a photo hyper-realistically.

The training of the first neural network by means of the first learning base is well known to the person skilled in the art.

Through this training, the first neural network learns how to modify, hyper-realistically, a photo representing a dental scene to simulate the dental event, for example, to add to it the representation of an orthodontic appliance. It therefore makes it possible to subject the dental scene virtually to the dental event and visualize the result thereof.

The training can in particular be performed by following the teachings of the article by Zhu, Jun-Yan, et al. *"Unpaired image-to-image translation using cycle-consistent adversarial networks"* (Open access Computer Vision Foundation).

In step 2), a source photo (FIG. 3A) is submitted to the first neural network for it to transform it into a hyper-realistic final image (FIG. 3B), that is to say one which seems to be a photo, the transformation simulating the dental event. For example, it adds to the source photo the representation of an orthodontic appliance.

The source photo is preferably an extra-oral view, for example a photo taken facing the patient, preferably with a dental retractor.

The source photo represents a source dental scene in a dental context, for example represents the dental arch of a patient suffering from a pathology "P". Preferably, it does not however represent a dental scene containing an arch that has been subjected to the dental event. In the example considered, it does not represent a dental scene in which the arch bears an orthodontic appliance.

In a preferred embodiment, the dental context is rare.

The rare dental context is preferably that of a dental pathology, preferably a pathology which affects less than 10%, less than 5%, less than 2% or less than 1% of the population.

The dental context can be a context for which fewer than 10 000, fewer than 5 000 or fewer than 1000 photos exist or are public, that is to say that can be accessed by anyone, possibly by payment. The access difficulty can notably result from regulatory constraints or practical constraints, for example for taking photos illustrating the dental context.

Preferably, the photos illustrating the dental context show the symptoms of a dental pathology, for example of a rare pathology, for example one which affects less than 10%, less than 5%, less than 2% or less than 1% of the population.

When the dental context relates to the occurrence of a pathology, the source photo can show symptoms of this pathology that can be identified by a dental care professional, in particular an orthodontist, or not.

If it does not represent such symptoms, it does however represent the source dental scene in this dental context because the pathology has been diagnosed with other means, for example from tomographic snapshots, preferably obtained by cone beam computed tomography, CBCT. For example, the photos show arches of patients suffering from root resorption.

Since there are few of the photos illustrating the dental context, it is difficult to train a neural network just with these photos. Step 2) advantageously transforms the source photo into a hyper-realistic final image which represents the result of the dental event if it were applied to the source dental scene.

By training several first neural networks to simulate different dental events, then by submitting the source photo to these networks, it is possible to multiply the final images.

Tests (FIGS. 3A and 3B) have shown that the final images are of very good quality, such that it is very difficult to detect that they are not photos.

In step 3), a "final" descriptor is created for the final image resulting from step 2). It provides a value for at least one attribute of the final image relating to the occurrence of the dental event, and a value for at least one attribute of the final image relating to the dental event.

For example, it specifies that the "presence of an orthodontic appliance" attribute has the value "yes" and that the "presence of the pathology P" attribute has the value "yes".

The descriptor of the final image can be produced manually, at least partially. Preferably, it is produced, at least partially, by a computer program.

In step 4), a historical record is created consisting of the final image and of the final descriptor, and it is added into the historical learning base. The final image and the final descriptor are then qualified as historical image and as historical descriptor, respectively.

The historical learning base can consist only of historical records generated following an enrichment method according to the invention. Alternatively, the historical learning base can comprise historical records generated following an enrichment method according to the invention and other historical records, for example created following conventional methods, notably by photo labeling, and notably by the labeling of the source photos.

Preferably, the cycle of steps 2) to 4) is repeated, preferably until the historical learning base comprises more than 5000, preferably more than 10 000, preferably more than 30 000, preferably more than 50 000, preferably more than 100 000 historical records.

Analysis of an Analysis Photo

As illustrated in FIG. 2, to analyze a photo to be analyzed, the method proceeds according to steps A) to C).

The photo to be analyzed is preferably in color, preferably in real color.

In step A), a historical learning base is created comprising historical records obtained following an enrichment method according to the invention.

In step B), a second neural network is trained by means of the historical learning base. Such training is well known to the person skilled in the art.

The second neural network can be, in particular, chosen from the list supplied in the preamble to the present description.

Through this training, the second neural network learns to determine, for the photos to be analyzed with which it is presented, values for the evaluated attributes in the historical descriptors. For example, each historical descriptor can specify a ("yes" or "no") value for the "presence of the pathology P" attribute. The second neural network then learns to determine whether a photo to be analyzed that is submitted to it has patterns indicating the presence of the pathology P.

In step C), the photo to be analyzed is presented to the second neural network, and an evaluation is thus obtained for the different attributes, for example "yes", with a probability of more than 99%, for the presence of the pathology P.

The analysis method can be used for therapeutic or non-therapeutic purposes, for example for research purposes or for purely aesthetic purposes.

It can be used for example to assess a dental situation of a patient during an orthodontic treatment or of a teeth whitening treatment. It can be used to monitor the movement of teeth or the progression of a dental pathology.

In one embodiment, the patient takes the photo to be analyzed, for example with their smartphone, and a computer, incorporated in the smartphone or with which the smartphone can communicate, implements the method. The patient can thus very easily request an analysis of their dental situation, without even having to move, by simply transmitting one, or preferably several, photos of their teeth.

The analysis of a photo to be analyzed is notably useful for detecting a rare sickness.

As now clearly emerges, the invention makes it possible to transform source photos representing a source dental scene in a dental context, into final images representing the source dental scene differently, the difference between the final images and the source photos being the result of the simulation of the dental event. It is thus possible to create a rich historical learning base, from few source photos, by adding to it these final images.

The addition of hyper-realistic final images thus makes it possible to enrich the historical learning base very rapidly.

Obviously, the invention is not limited to the embodiments described above and represented.

Rebalancing a Learning Base

In particular, steps 1) to 4) can be implemented to enrich a historical learning base in order to "rebalance" it.

For example, in step 1), the first neural network can be trained to provide hyper-realistic first images of a dental arch representing this arch in so-called "simulated" observation conditions, in particular from a so-called "simulated" direction of observation, from first photos of the dental arch taken in first observation conditions different from the simulated observation conditions, in particular from a first direction of observation different from the simulated direction of observation.

Notably, the first neural network can be trained to transform first photos of first dental scenes representing certain teeth, for example the incisors, into first hyper-realistic images representing other teeth, for example molars.

The dental event is then a modification of the conditions of observation of the dental arch, from the first observation conditions implemented to acquire the first photos to the simulated observation conditions. The first neural network is thus trained to simulate the effect of this modification on the first dental scenes.

In step 2), a source photo is submitted to the trained first neural network, representing a source dental scene in a dental context in which the source dental scene is observed in first observation conditions, for example a source photo representing incisors, without the molars being visible.

The first neural network then generates a final image representing, hyper-realistically, the source dental scene after simulation of the dental event. In other words, the final image represents, hyper-realistically, the source dental scene observed in the simulated observation conditions. For example, it represents molars of the dental arch.

Steps 3) and 4) make it possible to create a descriptor of the final image and associate it with the final image to form a historical record. The historical record is then added into the historical learning base.

If the historical learning base initially contained an excessive proportion of records relating to images representing incisors, this addition contributes to increasing the number of records relating to images representing molars. The learning base is thereby advantageously better balanced.

The patient is not limited to a human being. A method according to the invention can be used for another animal.

A learning base is not necessarily composed of records of "pairs".

The invention claimed is:

1. A method for enriching a historical learning base, said method comprising the following steps:
   1) training of a first neural network to transform first photos of first dental scenes into first hyper-realistic images to simulate the effect of a dental event on said first dental scenes;
   2) submission, to the trained first neural network, of a source photo representing a source dental scene in a dental context, so as to obtain a final image representing, hyper-realistically, the source dental scene after simulation of the dental event;
   3) creation of a descriptor of said final image, or "final descriptor"; and
   4) creation of a historical record consisting of said final image that has been obtained from the trained first neural network, and the final descriptor, and addition of said historical record in the historical learning base.

2. The method as claimed in claim 1, wherein the dental event is chosen from among an application of an orthodontic appliance, a dental treatment, the occurrence of a pathology, a modification of a form, of a color or of a position of a tooth or several teeth and/or of the tongue and/or of the gum and/or of an arch and/or of a temporomandibular joint and/or of the form of the face, and/or of a relationship between the two arches, and a modification of the conditions of observations of a first dental scene.

3. The method as claimed in claim 1, wherein more than 10 000 first photos are public.

4. The method as claimed in claim 1, wherein the dental context is that of a dental pathology which affects less than 10% of the population and/or for which fewer than 10 000 photos representing a dental arch suffering from said dental pathology are public.

5. The method as claimed in claim 4, wherein the public photos do not show the symptoms of said dental pathology.

6. The method as claimed in claim 1, wherein the first neural network is trained to, in step 2), only add one or more elements to the source photo.

7. The method as claimed in claim 6, wherein the first neural network is trained to, in step 2), add only an orthodontic appliance to the source photo.

8. The method as claimed in claim 1, wherein, in step 1), several first neural networks are trained to simulate the effect of different dental events, then, in step 2), the source photo is submitted to said trained first neural networks so as to generate several final images.

9. The method as claimed in claim 1, wherein the first photos and/or the source photo are extra-oral views taken by means of a dental retractor.

10. A method for analyzing a photo to be analyzed representing a dental scene to be analyzed, said method comprising the following steps:
   A) creation of a historical learning base comprising more than 1000 historical records, by implementing an enrichment method as claimed in claim 1;
   B) training of a second neural network, by means of the historical learning base; and
   C) submission, to the trained second neural network, of the photo to be analyzed, so as to obtain a descriptor of the photo to be analyzed.

11. The method as claimed in claim 10, wherein:
   before step C), the photo to be analyzed is taken by the patient with their smartphone,
   step C) is implemented by a computer, incorporated in the smartphone or with which the smartphone can communicate,
   after step C), the computer informs the patient, preferably via the smartphone, of the result of the analysis.

12. A method for enriching a historical learning base, said method comprising the following steps:
   1) training of a first neural network to transform first photos of first dental scenes into first hyper-realistic images to simulate the effect of a dental event on said first dental scenes;
   2) submission, to the trained first neural network, of a source photo representing a source dental scene in a rare dental context, so as to obtain a final image representing, hyper-realistically, the source dental scene after simulation of the dental event;
   3) creation of a descriptor of said final image, or "final descriptor"; and
   4) creation of a historical record consisting of said final image that has been obtained from the trained first neural network and the final descriptor, and addition of said historical record in the historical learning base.

13. A method for analyzing a photo to be analyzed representing a dental scene to be analyzed, said method comprising the submission, to a trained second neural network, of the photo to be analyzed, so as to obtain a descriptor of the photo to be analyzed, the trained second neural network having been trained by means of a historical learning base enriched by a method for enriching a historical learning base by training a first neural network to transform first photos of first dental scenes into first hyper-realistic images to simulate the effect of a dental event on said first dental scenes; submitting, to the trained first neural network, a source photo representing a source dental scene in a dental context, so as to obtain a final image representing, hyper-realistically, the source dental scene after simulation of the dental event; and creating a descriptor of said final image, or "final descriptor"; and creating a historical record consisting of said final image that has been obtained from the trained first neural network and the final descriptor, and addition of said historical record in the historical learning base.

* * * * *